United States Patent [19]
Mandl et al.

[11] Patent Number: 5,477,473
[45] Date of Patent: Dec. 19, 1995

[54] SENSOR-DRIVE AND SIGNAL-PROCESSING METHOD

[75] Inventors: Roland Mandl, Ortenburg; Heinrich Baumann, Vilshofen, both of Germany

[73] Assignee: Micro-Epsilon Messtechnik GmbH & Co. KG, Ortenburg, Germany

[21] Appl. No.: 185,908

[22] PCT Filed: Mar. 25, 1993

[86] PCT No.: PCT/DE93/00273

§ 371 Date: Feb. 1, 1994

§ 102(e) Date: Feb. 1, 1994

[87] PCT Pub. No.: WO93/20409

PCT Pub. Date: Oct. 14, 1993

[30] Foreign Application Priority Data

Apr. 2, 1992 [DE] Germany ............... 42 10 981.7

[51] Int. Cl.⁶ ............... G01B 7/14; G01B 7/00; G01D 3/02; G01D 5/22

[52] U.S. Cl. .......... 364/576; 364/560; 324/207.11; 324/207.13; 324/207.18; 340/870.36

[58] Field of Search .............. 364/576, 560, 364/721, 724.03; 73/178 R; 324/207.11, 207.13, 207.18; 340/870.36, 870.35

[56] References Cited

U.S. PATENT DOCUMENTS

| | | | |
|---|---|---|---|
| 4,584,658 | 4/1986 | Ottobre et al. | 364/721 |
| 4,590,575 | 5/1986 | Emplit | 364/509 |
| 4,599,560 | 7/1986 | Sanford et al. | 364/560 |
| 5,053,983 | 10/1991 | Hyatt | 364/724.03 |
| 5,191,791 | 3/1993 | Gerardi et al. | 73/178 R |

FOREIGN PATENT DOCUMENTS

| | | |
|---|---|---|
| 0450829 | 10/1991 | European Pat. Off. . |
| WO86/03831 | 7/1986 | WIPO . |
| WO89/04949 | 6/1989 | WIPO . |
| WO89/08819 | 9/1989 | WIPO . |

OTHER PUBLICATIONS

Electrical Design News, "LVDT interface chip's functional blocks offer versatility", Bd. 31, No. 11, May 29, 1986, pp. 159–166 and 168.

Electronic Engineering, "Monolithic signal conditioner simplifies displacement sensing", Bd. 62, No. 759, Mar. 1990, pp. 41, 42, 44, and 46.

IEEE, "A Multi-Channel Digital Demodulator For LVDT and RVDT Position Sensors", May 1989, pp. 20.5.1–20.5.5.

Primary Examiner—Emanuel T. Voeltz
Assistant Examiner—M. Kemper
Attorney, Agent, or Firm—Bell, Seltzer, Park & Gibson

[57] ABSTRACT

A sensor-drive and signal-processing method, wherein the primary side of the sensor is supplied with a preferably oscillating input signal, and the output signal from the secondary side of the sensor is demodulated, if need be, filtered and amplified, is developed for realizing smaller structural designs for sensors and associated electronics such that both the sensor drive on the primary side and the signal conditioning and processing on the secondary side occur in digital form.

18 Claims, 7 Drawing Sheets

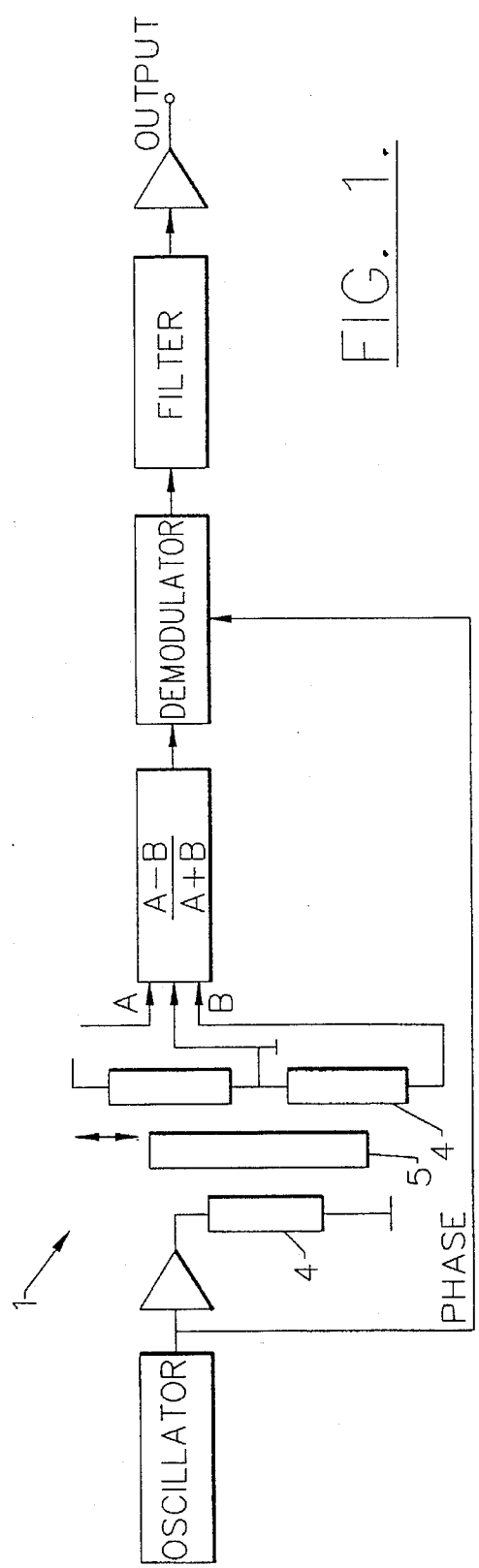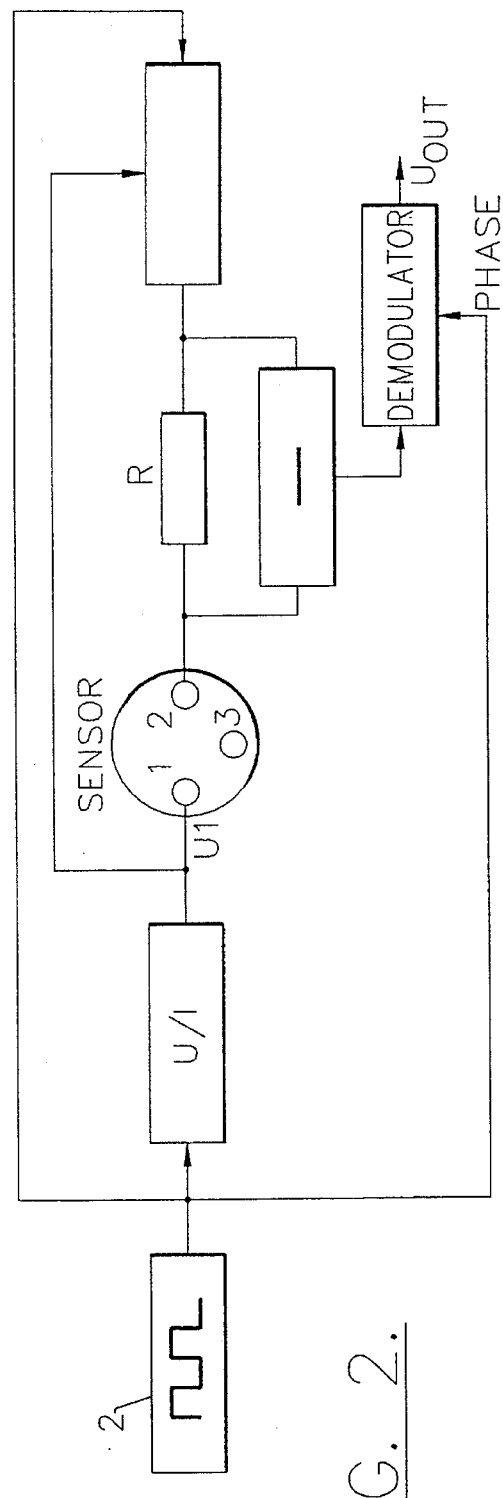

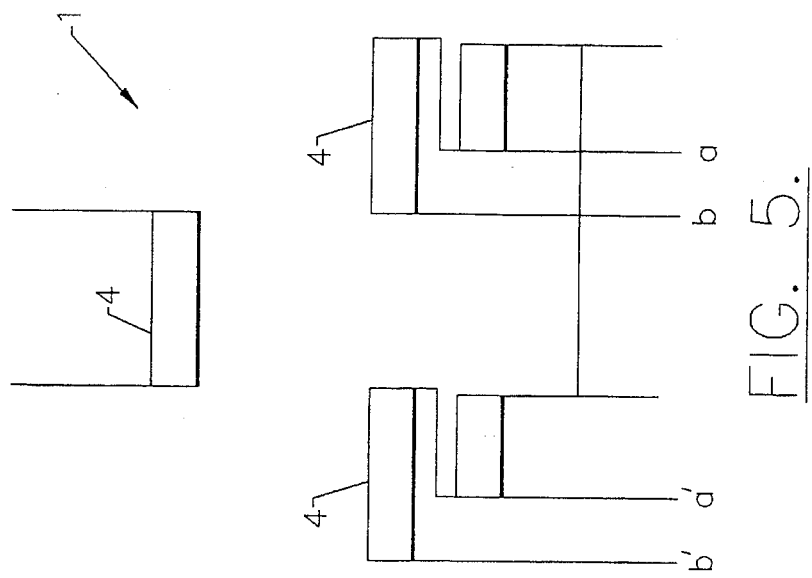
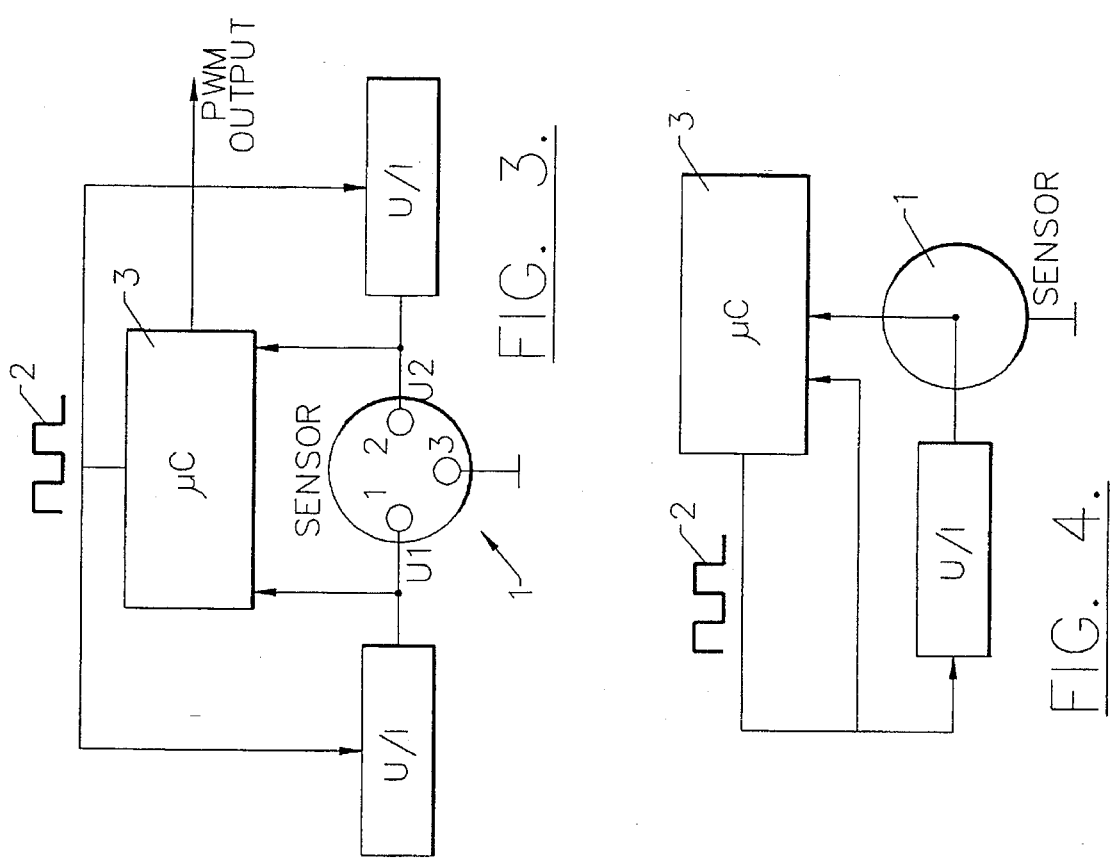

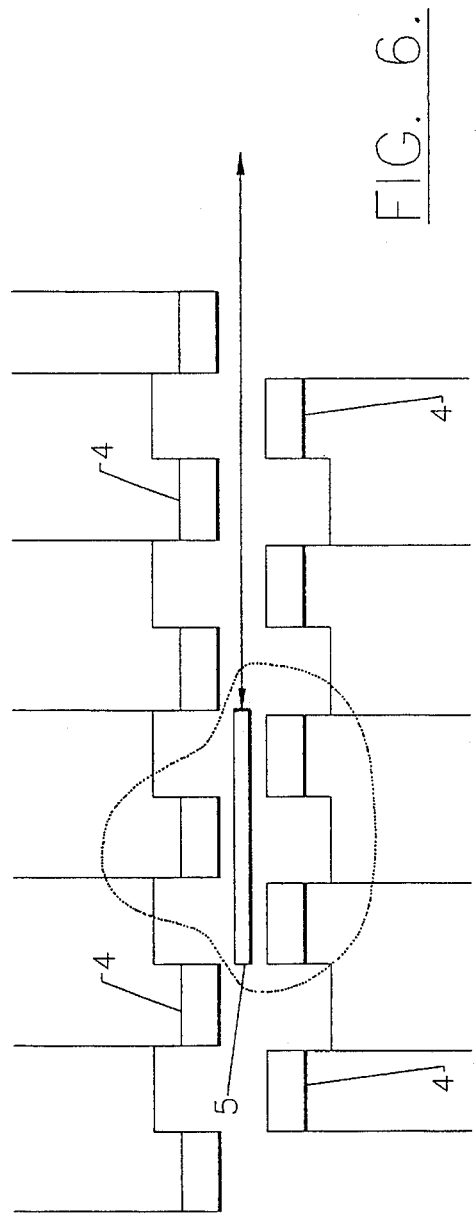
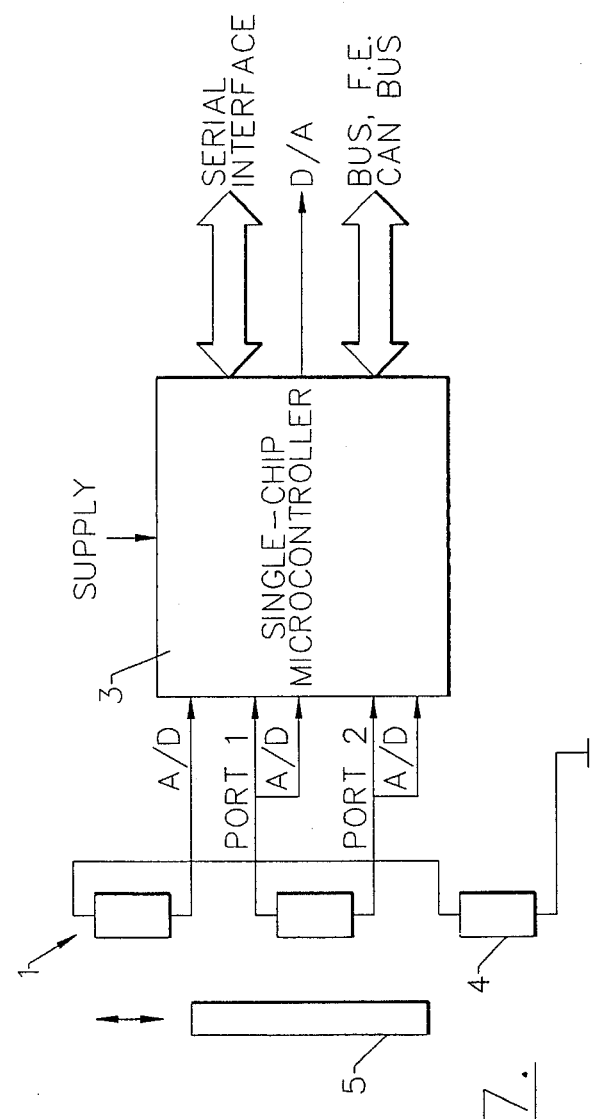
FIG. 6.
FIG. 7.

SUPPLY SIGNAL:
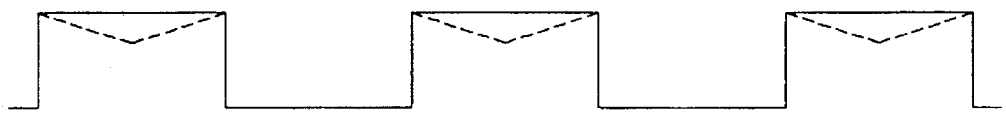
SAMPLE AND HOLD SIGNAL:
DIGITIZED SIGNAL:
RECONSTRUCTED SIGNAL:
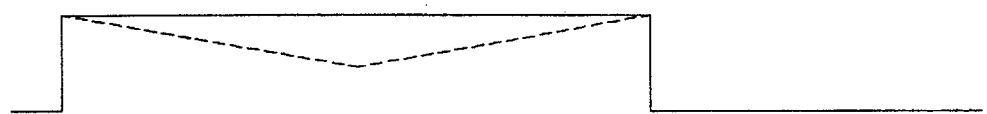
FIG. 9.

☐ = TIMER INTERRUPT ROUTINE
☐ = A/D CONVERTER INTERRUPT
⚡ = HARDWARE INTERRUPT
SQUARE–WAVE SIGNAL GENERATION:
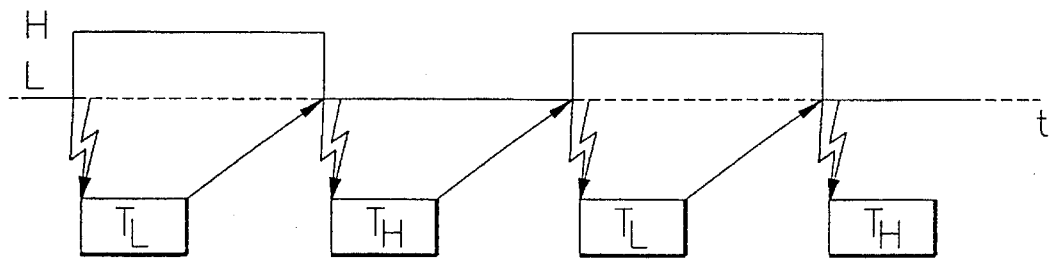
SQUARE–WAVE SIGNAL GENERATION AND SAMPLING:
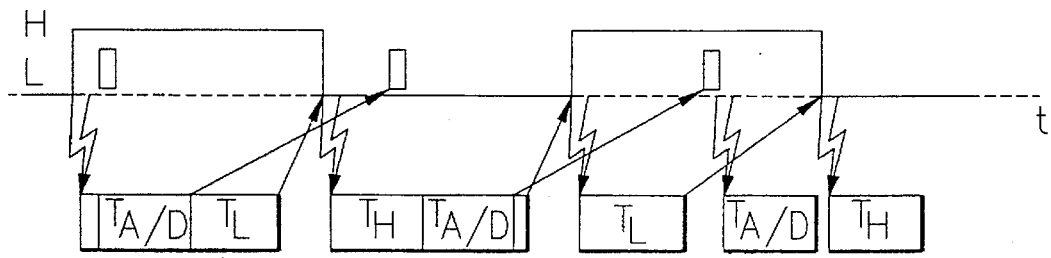
NESTED SAMPLING:
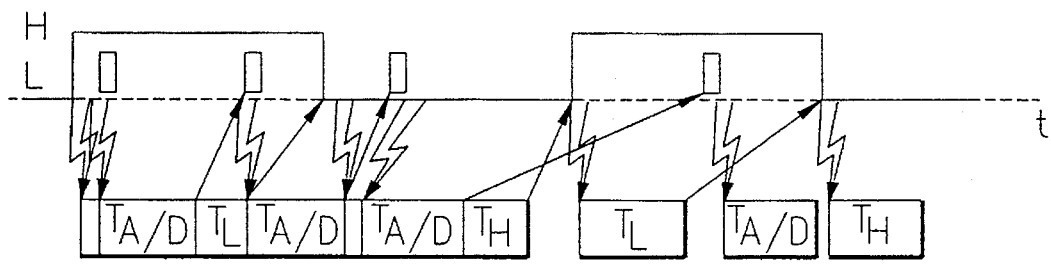
FIG. 11.

SENSOR-DRIVE AND SIGNAL-PROCESSING METHOD

This invention relates to a method of driving a sensor and processing a signal, wherein on the primary side a preferably oscillating input signal is supplied to the sensor, and on the secondary side the output signal of the sensor is demodulated, if need arises, filtered and amplified.

The sensors to be driven may be any desired displacement pickups or displacement measuring sensors. They may include in this instance linear, inductive displacement pickups and measuring scanners which operate by the principle of a linear variable differential transformer (LVDT). Likewise, they may include noncontacting displacement pickups on the eddy-current basis, noncontacting inductive displacement pickups, and noncontacting capacitive displacement pickups. Essential is by all means that the sensors receive on their primary side an input signal, and that on the secondary side the output signal of the respective sensor is processed or conditioned in the broadest meaning.

When using an LVDT sensor, in conventional systems the primary side of the LVDT coil is supplied with an oscillating signal via an oscillator. The demodulation of the secondary output signal and an often required compensation for linearity and transverse sensitivity cause a considerable expenditure of circuitry in the analog evaluation of the output signal from the secondary side. FIG. 1 is a block diagram illustrating the basic circuit of an analog LVDT electronics. In practice, the circuit illustrated therein is problematic for various reasons. Thus, it is not possible, or possible only at a great expenditure of electronic devices, to compensate for linearity errors caused by the sensor geometry. In particular, in the case of LVDT sensors, the ratio of housing length to measuring range is quite considerably restricted by the linear displacement measuring range of the sensor. Finally, in analog signal processing, limits are set to a miniaturization, cost reduction, and stable configuration.

It is therefore the object of this invention to describe a sensor-drive and signal-processing method, which allows to use the smallest designs especially for the evaluation electronics, while simultaneously lowering the costs and maintaining stabilization or stability.

The method of driving a sensor and processing a signal in accordance with the invention accomplishes the foregoing object with the characteristic features of claim 1. Accordingly, the method of the initially described kind is developed such that the signal conditioning or processing on the secondary side occurs in digital form.

This invention has recognized that a further miniaturization of evaluation electronics is favored in that the signal conditioning or processing on the secondary side occurs from the beginning in digital form. In a very particularly advantageous manner, both the sensor drive and the signal conditioning or processing is effected by means of a microcontroller. Consequently, no microchip with fixed input data is used, but preferably a software controlled controller. Only this allows to realize with simplest electronic devices a sensor having bus capabilities.

The microcontroller serving to both drive the sensor drive and condition or process the signal is preferably a single-chip microcontroller, which permits to reduce the size of the evaluation electronics quite significantly. Simultaneously, the quasi monolithic module allows to create a very significant stability of the electronics.

With respect to a coordination between the input signal on the primary side and the output signal on the secondary side of the sensor, it is of a very special advantage, when the sensor is fed directly by a signal generated by the microcontroller. The signal as supplied is preferably a square-wave signal, i.e. square-wave supply. To generate the square-wave signal, a timer as is present in almost all common controllers may be used. Likewise, it is conceivable that the input signal is generated by a software controlling the microcontroller. In other words, the sensor is no longer energized via an oscillator, but via a computer. The signal course is, in this instance, predetermined by a corresponding software.

To the extent it is possible to pick up a differential voltage at the output of the sensor, same is in a very particularly advantageous manner digitized at discrete instants of time with an analog-to-digital (A/D) converter integrated in the microcontroller. In accordance with Shannon's sampling theorem, this will require for square-wave signals, depending on accuracy, at least some 10 to 100 sampling values, so as to reconstruct the signal. Since the supply frequency of the sensor is to amount to a few kHz, it would be necessary to perform the sampling at at least 50 to 500 kHz. However, this is not possible with the A/D converters usually integrated in a microcontroller, since same have in most cases only a minimal conversion time of approximately 100 μsec. or 10 kHz.

Should a substantially identical signal sequence occur over several successive periods—which practically occurs always in mechanically sluggish systems, such as in the case of the movable core of a linear variable differential transformer (LVDT), and should the microcontroller have a fast-acting sample and hold circuit, it will be possible in a further advantageous manner to reconstruct a signal—signal shape and amplitude—by means of an algorithm in a so-called undersampling (note FIG. 9), it being even possible to reconstruct the complete signal shape and amplitude with a slow-acting A/D converter.

In the simplest case, a sampling value is obtained from each signal period, which is time shifted within the respective period of time. The sampling values are successively stored in the microcontroller, so that the values obtained from the undersampling result again in the original signal shape.

To the extent the existing A/D converter is able to convert several sampling values per signal period, the values may be received or stored in nested form, so that within a few periods, it is possible to reconstruct the complete signal shape or at least the portions of the signal shape which are relevant for the demodulation.

In a further advantageous manner it would be possible to use the Fourier analysis for the demodulation. Likewise, it would be conceivable to base the demodulation on a difference of the summed up amplitude values. To this end, two subtotals of the amplitude values $$s_{1,2} = \sum_{j=i_1}^{i_2} u_j, \quad s_{3,4} = \sum_{j=i_3}^{i_4} u_j$$

are formed and subtracted from one another.

$$d = s_{1,2} - s_{3,4}$$

The demodulation value d is thus defined over a period interval and corresponds in the case of $$i_1 = 0, i_2 = i_3 = \frac{T}{2}, i_4 = T$$

to an analog demodulation. When limiting the index ranges, it is possible to advantageously gate out transients or overshoots which may be present on the signal. Depending on the signal shape, this method of demodulation is at least equivalent to an analog demodulation, but mostly it is quite considerably superior. With respect to the sampling time instants, it is highly advantageous, when the sampling time instants on the secondary side are synchronized with the signal generation on the primary side, so as to enable a synchronized modulation. Phase shifts in the path of transmission can be balanced by the selection of the indices.

The digital demodulation of the present invention permits an approximately synchronous sampling of several input signals primarily as a result of the possibility of scrambling the sampling time instants. Forming the ratio of the difference terms or demodulation values d allows to accomplish in sensors with quarter, half, or full bridge configurations that noise variables and transverse sensitivities are compensated, for example, by measuring the supply or reference voltage. Consequently, the method of this invention is also suitable for a plurality of similar applications, in which a ratio formation is advantageous.

When the sensor is a level sensor operating by capacitance or resistivity, it is possible to compensate influences caused by the dielectric constant or the conductance of the fluid as a function of the temperature or the electrochemical properties of the fluid. Two measuring electrodes having the length of the desired measuring range are in this instance used for measuring the depth of immersion. A third electrode, which is already immersed in the fluid at the instant of the measuring, is used for forming the quotient. Thus, the output signal is dependent only on the filling level.

FIG. 2 is a block diagram of a resistive or capacitive level sensor, the output signal of which is conditioned in analog form. FIGS. 3 and 4 are block diagrams of a resistive or capacitive level sensor, the output signal of which is conditioned in digital form. In the sensor shown in FIG. 4, a compensation for conductance is absent.

In the level sensor shown in FIGS. 3 and 4, the influences are compensated by the dielectric constant or the conductance of the fluid as a function of the temperature or electrochemical properties of the fluid. Errors caused by instabilities of the oscillator amplitude are eliminated by a simultaneous demodulation of the oscillator amplitude and ratio formation. This allows to reduce the influence of the supply amplitude in the case of quarter or half bridges. The method of the present invention can be applied likewise, for example, to other capacitive or inductive sensors. Errors of the A/D converter (R2R or PWM output) may be compensated by measuring the output amplitude. The measuring of the supply voltage to the assembly allows to compensate for dependencies of the energization on quarter bridges. This will turn out to be especially advantageous, when a ratio formation of two demodulated square-wave signals is not possible.

Furthermore, in accordance with the method of this invention, it is of quite a special advantage that the ratio of overall length to measuring range can be improved by the factor 1.5 to 7. An internal linearization can be carried out by approximation of the error curve by means of an approximation polynomial, and permits to improve the ratio of overall length to measuring range by the factor 1.5 to 3. The necessary polynomial coefficients may be coded in a non-volatile memory of the microcontroller or in particularly advantageous manner also in the sensor itself, for example, as ohmic resistors. This allows to ensure even an exchangeability of sensor and electronic devices. The inquiry of the resistors may occur, for example, coupled to dc voltage, via the A/D converter, whereas in operation the sensor operates coupled to ac voltage.

The arrangement of more than three coils, one after the other, and a switching of the coil triple to be measured—as a function of the detected core position of an LVDT sensor—allows to further improve the ratio of overall length to measuring range. Since a resolution within a triple remains constant, the accuracy related to the overall measuring range is thus substantially improved at the same time.

If an increase in resolution is desired only in the center of the possible measuring range, same may be accomplished by dividing the reference voltage, for example, by the factor 2. The drive range of the A/D converter is thus always optimally utilized. As a result, the resolution of the system can be dynamically increased in the center of the measuring range. This effect may, however, be obtained likewise by a somewhat costlier switching of the coil winding. For this purpose, the two external coils may also have a single or double number of turns. In this instance, a switching will occur in the center of the measuring range to the set of coils having, for example, a double number of turns. To this end, special reference is made to FIG. 5 which relates to the increase in resolution in the center of the measuring range.

The already previously indicated use of an approximation function for an error compensation enables in connection with the bus capability of the microcontroller a fully automatic calibration and linearization of the pickup. A computer-controlled calibration device would allow to compute the necessary polynomial coefficients and to transmit same directly to the sensor electronics. In the case of a coding in the sensor, for example, with resistors, same may occur fully automatically by means of a laser trimming.

The realization of the method of driving a sensor and processing a signal in accordance with the invention allows to replace expensive and costly components, such as, for example, the oscillator, demodulator, a divider, etc., which have in the past been absolutely necessary for the analog technique, with an extremely inexpensive and widely used microcontroller. The remaining analog components, for example, the A/D and D/A converters, are mostly already integrated in the controller, so that external analog components are practically no longer needed. Thus, a "single-chip" solution is realized. This results not only in very significant price advantages when realizing sensors operated by the method of this invention, but also in very considerably reduced space requirements for the electronic devices, so as to enable a further miniaturization.

Various possibilities exist to perfect and further develop the teaching of the present invention in advantageous manner. To this end, reference may be made on the one hand to the claims dependent on claim 1, and on the other hand to the following description of the invention with reference to the drawing. In combination with the description of the invention with reference to the drawing, also generally preferred embodiments and further developments of the teaching will be described. In the drawing:

FIG. 1 is a block diagram illustrating the basic circuit of an analog LVDT electronics;

FIG. 2 is a block diagram of a resistive or capacitive level sensor, the output signal of which is conditioned in analog form;

FIG. 3 is a block diagram of a resistive or capacitive level sensor, the output signal of which is conditioned in accordance with the invention in digital form;

FIG. 4 is a block diagram of a resistive level sensor without conductance compensation, the output signal of which is conditioned in accordance with the invention in digital form;

FIG. 5 is a block diagram schematically illustrating the increase in resolution in the center of the measuring range;

FIG. 6 is a block diagram schematically illustrating an enlargement of the measuring range with a multicoil system;

FIG. 7 is a block diagram schematically illustrating a digital LVDT electronics;

FIG. 9 is a schematic view of a timing diagram of the undersampling;

FIG. 11 a schematic view of the timing of interrupt routines.

Figure 8:
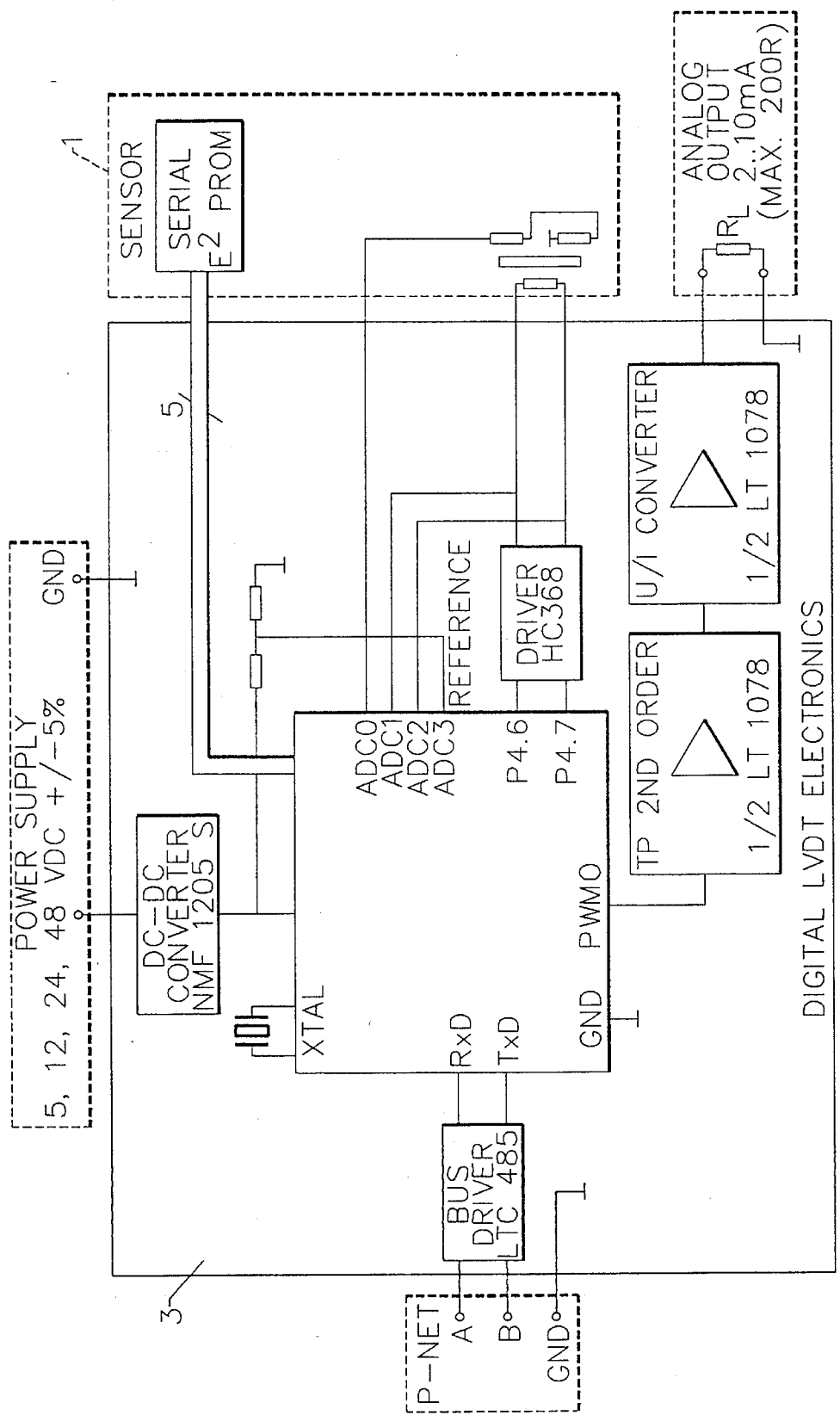
FIG. 8 is a block diagram illustrating schematically and in detail the digital LVDT electronics of FIG. 7.

FIGS. 3, 4, 7, and 8 illustrate each a block diagram of digital electronics in accordance with the invention for use of the method of this invention. Specifically shown in FIGS. 3 and 4 is a resistive level sensor 1 with and without conductance compensation. The sensors 1 are supplied on their primary side with a square-wave signal 2. In a manner in accordance with the invention, the secondary signal conditioning and processing occurs in digital form. Both the sensor drive and the signal conditioning or processing occur by means of a microcontroller 3. The latter 3 is a single-chip microcontroller, as can easily be noted from the illustrations in FIGS. 3, 4, 7, and 8.

FIG. 5 is a block diagram illustrating the increase in resolution in the center of the possible measuring range. In so doing, a division of the reference voltage, for example, by the factor 2 is accomplished. The two external coils have a single or double number of turns. In the center of the measuring range, a switching occurs to the set of coils with the double number of turns.

Illustrated in FIG. 6 is an enlargement of the measuring range with a multicoil system. The arrangement of several coils 4, one after the other, and a switching of the measuring coil triple as a function of the detected position of core 5 allow to further improve the ratio of overall length to measuring range. As already previously indicated, the resolution of the triple remains constant in this instance, so that also the accuracy related to the total measuring range is significantly improved at the same time.

FIG. 7 is a block diagram of a digital LVDT electronics, in which microcontroller 3 biases sensor 1 with a square-wave signal. In like manner, the signal is conditioned and processed in this arrangement.

FIG. 8 is a detailed view of the digital LVDT electronics. Details can be noted from this Figure, so that further explanations are not necessary.

FIG. 9 is a schematic view of a timing diagram of the undersampling, showing the supply signal, the sample and hold signal, the digitized signal, and the reconstructed signal. Essential is that a known reference phase allows to use by a controlled violation of the sampling theorem a slower acting analog-to-digital converter ($\leq 10$ kHz conversion rate at 5 kHz square-wave signal frequency).

Figure 10:
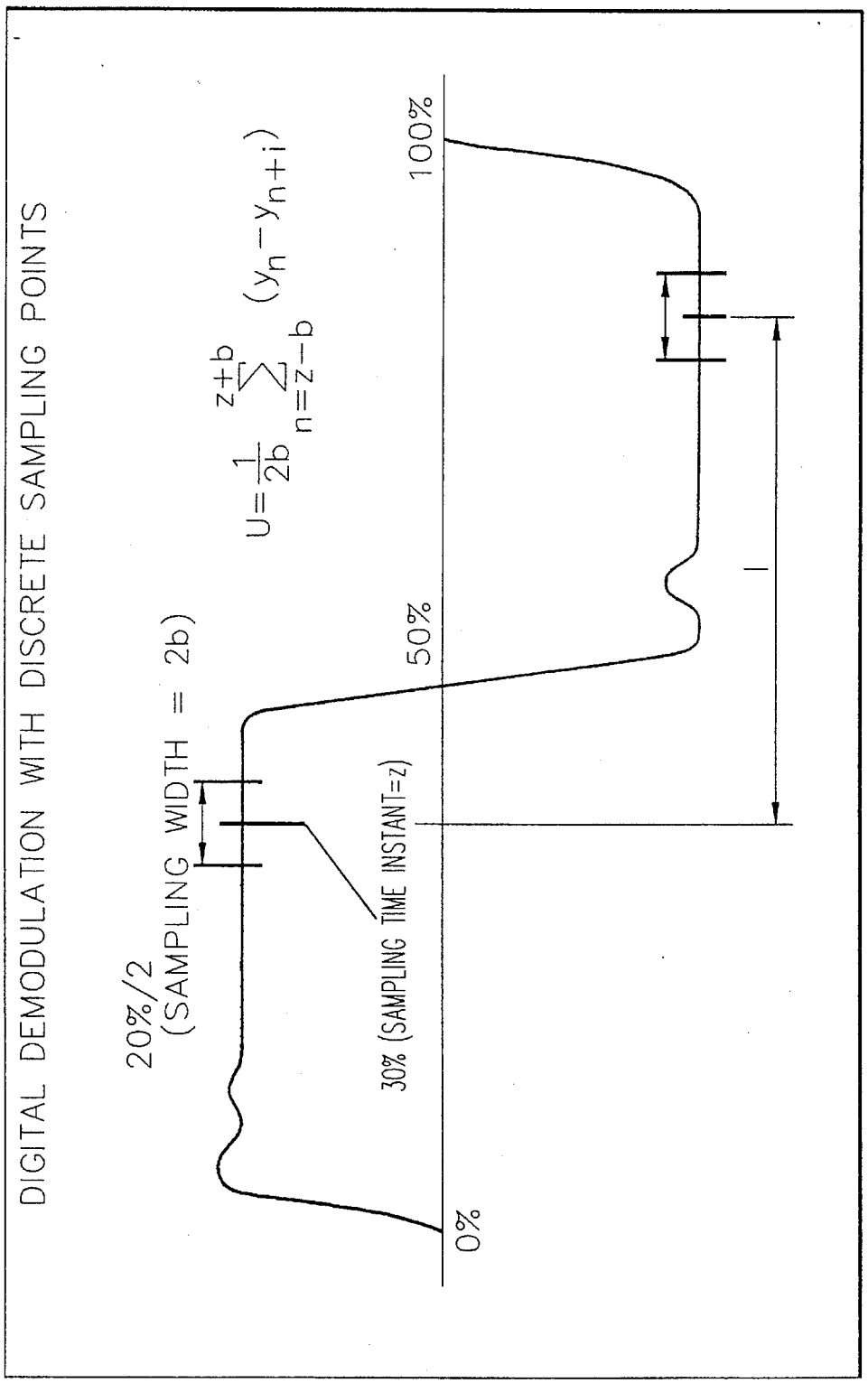
FIG. 10 is a graph of the digital demodulation with discrete sampling points.

The digital demodulation as shown in the illustration of FIG. 10 occurs in that a period of the undersampled signal is expanded in a Fourier series up to the coefficient k. From the coefficient $$c_k = \sum_{n=1}^{N} y_n * \cos[2*PI*N*f_k/N],$$

it is possible to calculate the signal energy from the spectral coefficient according to the formula $$E_y = 1/2 \sum_{k=1}^{K} (c_k\;2 + s_k\;2)$$

where

N=number of support points of the undersampled signal
M=number of support points of the signal sampled according to the sampling theorem
K=number of coefficients
u=original signal
y=undersampled signal.

A comparison with the energy of the output signal obtained by integral calculus $$E_u = 1/M \sum_{m=1}^{M} (u_m\;2)$$

results even in the case of square-wave signals with considerable overshoots only in deviations in the per mille range. This may give rise to expectations for results which are usable in practice. The limitation of the coefficient expansion to a few values allows to damp the influence of higher-frequency spectral components in the signal, so as to permit to here suppress noises already to a great extent (low pass filtering).

Finally shown in FIG. 11 is the timing of the interrupt routines. The illustration is self-explanatory, so that a further description thereof is unnecessary.

In conclusion, it should again be pointed out that the foregoing description serves only to describe the teaching of the present invention, but does not limit same to the above-described embodiments.

We claim:

1. A method of driving a sensor and processing a signal, wherein the sensor has a primary side and a secondary side, the method comprising the steps of supplying the primary side of the sensor with an oscillating input signal and detecting a corresponding output signal on the secondary side of the sensor, wherein the output signal includes a periodically varying differential voltage having a substantially identical sequence of differential voltages in a plurality of successive periods, and wherein said detecting step comprises the step of digitizing the differential voltage of the output signal, said digitizing step comprising the step of undersampling the output signal, wherein said undersampling step comprises the steps of sampling the differential voltage within each period and time shifting the sampled differential voltage to corresponding portions of other periods, said digitizing step also comprising the step of reconstructing the undersampled output signal based upon the sampled and time shifted differential voltages such that the output signals of the sensor are processed on the secondary side of the sensor in digital form.

2. A method as in claim 1 wherein said reconstructing step comprises the step of performing a Fourier analysis of the sampled and time shifted differential voltages.

3. A method as in claim 1 wherein said reconstructing step comprises the steps of summing the respective amplitudes of the sampled differential voltages over first and second portions of a predetermined time period, and determining the difference between the respective sums of the amplitudes in the first and second portions of the predetermined time period.

4. A method as in claim 1 wherein said detecting step comprises detecting the corresponding output signals of the sensor with a microcontroller.

5. A method as in claim 4 wherein said step of detecting the corresponding output signals with a microcontroller comprises the step of detecting the corresponding output signals of the sensor with a single-chip microcontroller.

6. A method as in claim 4, wherein the microcontroller includes an analog-to-digital converter, and wherein said step of detecting the corresponding output signals of the sensor with a microcontroller includes the step of detecting the corresponding output signals of the sensor with the analog-to-digital convertor of the microcontroller.

7. A method as in claim 6, wherein the analog-to-digital convertor of the microcontroller includes a fast-acting sample and hold circuit, and wherein said reconstructing step comprises the step of reconstructing both the shape and amplitude of the undersampled output signal.

8. A method as in claim 4 wherein said digitizing step comprises the step of storing the sampled and time shifted differential voltages in successive memory locations within the microcontroller.

9. A method as in claim 8, wherein said undersampling step comprises the step of sampling the differential voltage several times within each period, and wherein said storing step comprises the step of storing each sampled differential voltage in nested form, so that within a few periods the complete output signal shape can be reconstructed.

10. A method as in claim 1 wherein said supplying step comprises the step of supplying the primary side of the sensor with a signal generated by a microcontroller.

11. A method as in claim 10, wherein said step of supplying the primary side of the sensor with a microcontroller generated signal comprises the step of supplying the sensor with a square-wave signal generated by the microcontroller.

12. A method as in claim 10, wherein said step of supplying the primary side of the sensor with a microcontroller generated signal comprises the step of generating the signal supplied to the primary side of the sensor with a timer provided in the microcontroller.

13. A method as in claim 10, wherein said step of supplying the primary side of the sensor with a microcontroller generated signal comprises the step of generating the signal supplied to the primary side of the sensor with a software routine stored in the microcontroller.

14. A method as in claim 10 wherein said step of supplying the primary side of the sensor with a microcontroller generated signal comprises the step of synchronizing said sampling step with the microcontroller generated signal so as to provide synchronous processing of the output signals.

15. A method as in claim 10 wherein said reconstructing step comprises the step of compensating for noise variables and transverse sensitivities.

16. A method as in claim 15 wherein the sensor is a capacitive level sensor for sensing a filling level of a fluid container, and wherein said compensating step comprises the step of compensating for influences caused by the dielectric constant of the fluid as a function of the temperature and electrochemical properties of the fluid.

17. A method as in claim 15, wherein said compensating step comprises the step of comparing the input signal supplied to the primary side of the sensor with the undersampled output signal with an approximation function.

18. A method according to claim 15 wherein the sensor is a resistance level sensor for sensing a filling level of a fluid container, and wherein said compensating step comprises the step of compensating for influences due to the conductance of the fluid as a function of the temperature and the electrochemical properties of the fluid.

* * * * *